(12) United States Patent
Norman

(10) Patent No.: US 10,828,589 B2
(45) Date of Patent: Nov. 10, 2020

(54) COLLECTOR MODULE AND A PARTICLE TRAP ARRANGED WITH AT LEASE ONE COLLECTOR MODULE

(71) Applicant: Conny Norman, Örebro (SE)

(72) Inventor: Conny Norman, Örebro (SE)

( * ) Notice: Subject to any disclaimer, the term of this patent is extended or adjusted under 35 U.S.C. 154(b) by 253 days.

(21) Appl. No.: 16/066,250

(22) PCT Filed: Nov. 24, 2016

(86) PCT No.: PCT/SE2016/051167
§ 371 (c)(1),
(2) Date: Jun. 26, 2018

(87) PCT Pub. No.: WO2017/116295
PCT Pub. Date: Jul. 6, 2017

(65) Prior Publication Data
US 2019/0015765 A1  Jan. 17, 2019

(30) Foreign Application Priority Data

Dec. 28, 2015 (SE) ........................ 1530201

(51) Int. Cl.
*B01D 45/08* (2006.01)
*B01D 45/04* (2006.01)
(52) U.S. Cl.
CPC ............. *B01D 45/08* (2013.01); *B01D 45/04* (2013.01)
(58) Field of Classification Search
CPC ...................................................... B01D 45/08
See application file for complete search history.

(56) References Cited

U.S. PATENT DOCUMENTS

| 3,594,980 A * | 7/1971 | Diehl ..................... B01D 45/08 422/168 |
| 5,300,131 A | 4/1994 | Richard |
| 7,988,909 B1 * | 8/2011 | Ruan ...................... A61L 9/145 422/4 |

FOREIGN PATENT DOCUMENTS

| EP | 1905501 | 4/2008 |
| GB | 2140707 | 12/1984 |
| WO | 0210649 | 2/2002 |
| WO | 2014196910 | 12/2014 |

OTHER PUBLICATIONS

Larsson, T. Kjellander, J.A.P. Overstam, H. "Aerosoltrap"—A New Device for Inertial Dust Separation: CFD Simulations with Experimental Validation I: Particulate Science and Technology, 31: 221 225 ISSN: 0272-6351 DOI: 10.1080/02726351.2012.715612 Publicerad: Apr. 11, 2013; whole document.

* cited by examiner

*Primary Examiner* — Robert A Hopkins
(74) *Attorney, Agent, or Firm* — Workman Nydegger

(57) ABSTRACT

The invention is constituted by a collector module for separating particles from a flow, in which the collector module has at least three outer walls and at least one baffle where the collector module has a lower opening having a lower mounting flange, and an upper opening having an upper mounting flange. The invention is further constituted by a particle trap system.

9 Claims, 3 Drawing Sheets

COLLECTOR MODULE AND A PARTICLE TRAP ARRANGED WITH AT LEASE ONE COLLECTOR MODULE

INTRODUCTION

The present invention relates to a collector module for separating particles from a flow, in which the collector module has at least three outer walls and at least one baffle. The application further discloses a particle trap comprising at least one collector module.

BACKGROUND OF THE INVENTION, PROBLEM DEFINITION AND PRIOR ART

Particles, such as minute fragments or quantity of matter, or different kinds of solid residues, constitute unwelcome solids in flows such as gas or liquid flows such as process water, waste water, waste gases etc. from different processes. Filtering or other unit operations for removal of particles can also be applied in order to, in a variety of ways, remove, separate, recover or concentrate substances such as solid matter.

There are a number of methods for filtering particles from a liquid aqueous or organic flow or a gaseous flow, in which conventional methods often include various filters in which the particles are retained. There are also other filtration methods, for separating particles, e.g. by varying the velocity of the flow. Examples of separating particles in an air flow by varying the velocity of the air flow are disclosed in patent application SE 0002782-1. The principle for air cleaning through a change of velocity of an air flow is described in SE 0002782-1, the principle is not further described herein. The device disclosed in SE 0002782-1 does not comprise a collector module.

Conventionally, various forms of filters have been used, through which a flow, such as an air stream, containing particles passes. The filters are arranged such that particles are retained by the filters, whilst a purified air stream passes through the filter. One important consideration for selection of the filter is the cut-off, i.e. to what extent particles of a certain size can pass the filter. A filter which blocks too small particles has the drawback that it easily becomes clogged, requires a powerful flow of the air stream, whereby efficiency thereof will be limited. A filter only filtering larger particles has the drawback that the small particles can pass freely through the filter. Discussed above is an air stream but equivalent to air stream could be a stream of a liquid, such as water, or another medium that is filtered.

The drawbacks of known filtering methods are, inter alia, that they are loud, have low performance, low energy efficiency, are bulky and generate a disposable retentate which is not environmentally friendly, since the filter often contains various forms of plastics or other toxic or biodegradable materials or combinations thereof.

Problems with currently existing solutions according to the above filtering techniques are thus related to noise levels, energy efficiency, the possibility of effectively filtering various particle sizes with one filter utilizing an environmentally friendly filter which is simple to transport and fit, and to create a filter where it is easy to recover or concentrate solid matters of various substances.

Further problems which the present invention aims to solve will be elucidated below in the detailed description of the various embodiments.

OBJECT OF THE INVENTION AND ITS DISTINCTIVE FEATURES

The object of the present invention is a collector module possible to arrange in a particle trap.

The invention relates to a collector module for separating particles from a flow, in which the collector module has at least three outer walls and at least one baffle where the collector module has a lower opening having a lower mounting flange, and an upper opening having an upper mounting flange.

According to further aspects of the improved collector module for separating particles from a flow:
the lower mounting flange and the upper mounting flange are provided with holes.
the collector module is arranged with at least four outer walls forming a substantially square-shaped channel containing at least one baffle.
the baffle forms a surface, in which the surface wholly or partially slopes towards a point, in which the point is arranged close to or against one or more outer walls to which said outer walls the baffle is affixed and whereby the arrangement of the baffle in the collector module provides an opening in the square channel formed by the outer walls.
the collector module is made from made from steel or other metals.
the collector module is arranged with an outlet arranged through at least one outer wall.

According to one embodiment, the invention is further constituted by a particle trap for separating particles from a flow, wherein the particle trap comprises at least one inlet module, at least one collector module, and at least one outlet module.

According to further aspects of the improved particle trap for separating particles from a flow:
According to one embodiment, two or more collector modules are placed such that the flow path through the particle trap is extended by alternately arranging a baffle against the first outer wall and the second outer wall, and the next baffle against the third outer wall and the fourth outer wall.
the inlet module is arranged with a flange arranged to fit the lower mounting flange of the first collector module of the particle trap.
the outlet module is arranged with a flange arranged to fit the upper mounting flange of the last collector module of the particle trap. The last collector module is the collector module arranged closest to the outlet from the particle trap and thus closest to the outlet module.

ADVANTAGES AND EFFECTS OF THE INVENTION

One advantage of the present invention is that a custom made particle trap could be realized by utilizing an adaptive number of collector modules. Further advantages include that the collector module is cost-effective in its design, and environmentally friendly both in terms of production and avoidance of any disposable consumables such as a filter.

FIGURE DRAWING

The invention will be described in greater detail below with reference to the attached figures, in which.

DETAILED DESCRIPTION OF EMBODIMENTS

Figure 1:
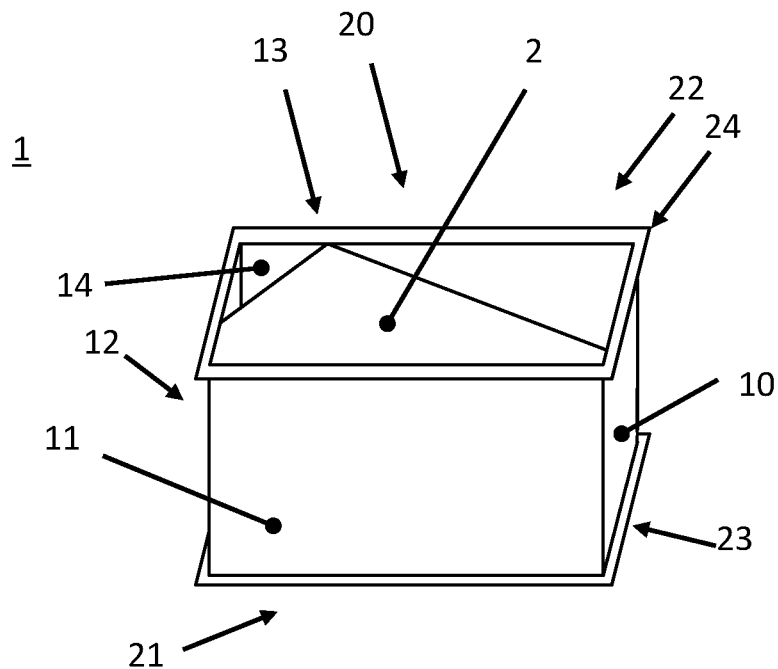
FIG. 1 shows a figure of a collector module according to one embodiment of the invention.

FIG. 1 shows a collector module in a view from the side. The collector module consists of at least three outer walls 10, 11, 12 preferably four walls 10, 11, 12, 13, a first outer wall 10, a second outer wall 11, a third outer wall 12 and a fourth outer wall 13. Where four outer walls 10, 11, 12, 13 are utilized, a substantially rectangular channel is formed, and where three outer walls are utilized, a substantially triangular channel (not shown in the figure) is formed. A baffle is a screen or wall of some kind which leads gas, liquid, particles or sound in a desired direction. In a collector module 1, at least one baffle 2 is arranged. The outer walls 10, 11, 12, 13 are arranged such that a channel 20 is formed, in which one or more baffles 2 are arranged. The baffle is arranged so that an opening 14 is formed. The opening 14 could vary in size between 1%-40% of the cross section area of the channel 20 and most preferably between 5%-20% of the cross section area of the channel 20. The length of an outer wall of the collector module is between 5 mm to 15 m and the height is between 60%-100% of the length. The collector module 1 is arranged with a lower opening 21 and an upper opening 22. The outer walls have an inner side and an outer side, in which the inner side is arranged against the channel 20. The lower opening 21 is arranged with a lower mounting flange 23 and the upper opening 22 is arranged with an upper mounting flange 24. An upper mounting flange 24 from a first collector module is possible to arrange to a lower mounting flange 23' of a second collector module 1'. The mounting flanges 23, 24 could be arranged with holes for mounting with bolts or rivets, the flanges could also be mounted by clinching, folded sheet, glued, or attached by a gasket or in another way for attaching two flanges to each other such as welding or soldering. A preferred mounting method, that also is easily removable, is a bolted joint where screws and nuts are used. The holes in the mounting flanges 23, 24 are adapted in size and location for the bolted joint. Rivets possible to use include blind rivets and pop rivets. A lower mounting flange 23 of a second collector module 1' is facing an upper mounting flange 24 of a first collector module 1 and in the case holes are utilized a hole in the lower mounting flange 23 of the second collector module 1' is facing a hole in the upper mounting flange 24 of the first collector module 1 where a screw could be placed. The mounted screw is secured by a nut on the opposite side of the flange and washers could also be utilized to secure the mounting. The number of holes in the flanges 23, 24 depends upon the actual implementation of the particle trap and is selected depending upon the medium used, size of collector module, pressure of flow etc. A gasket could be used between a lower mounting flange 23 and an upper mounting flange 24 to seal the connection between a first collector module 1 and a second collector module 1' and avoid leakage of the used medium.

Figure 2:
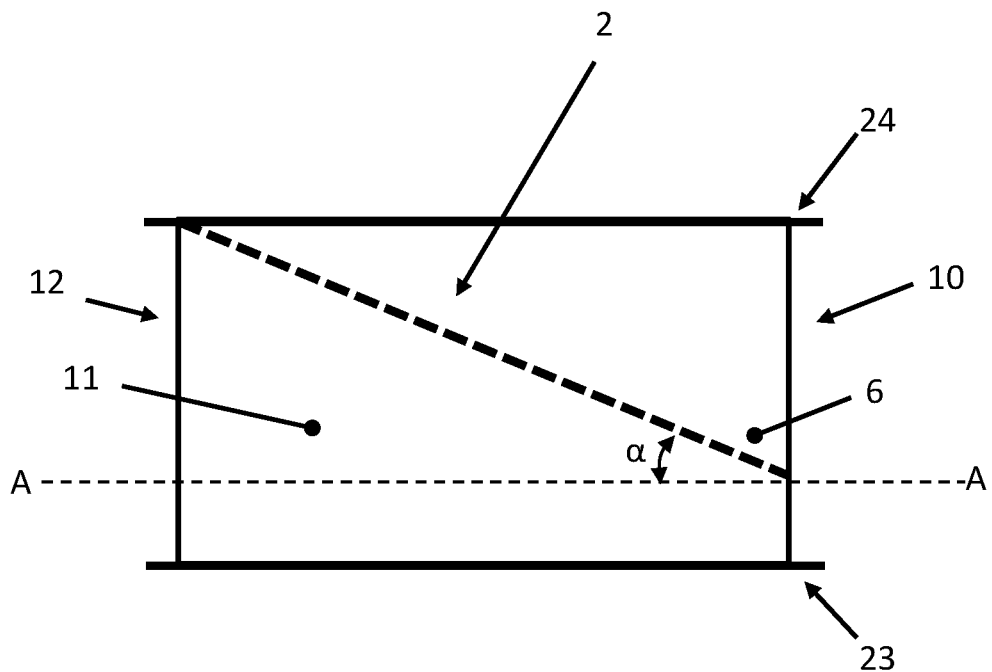
FIG. 2 shows a figure of a collector module in side view according to one embodiment of the invention.

FIG. 2 shows the collector module 1 from the side and the baffle 2 is partly shown in a cross section perspective. A point 6 is shown located close to the first outer wall 10 and the second outer wall 11. At point 6 the particles from the flow are collected or otherwise extracted or concentrated.

Figure 3:
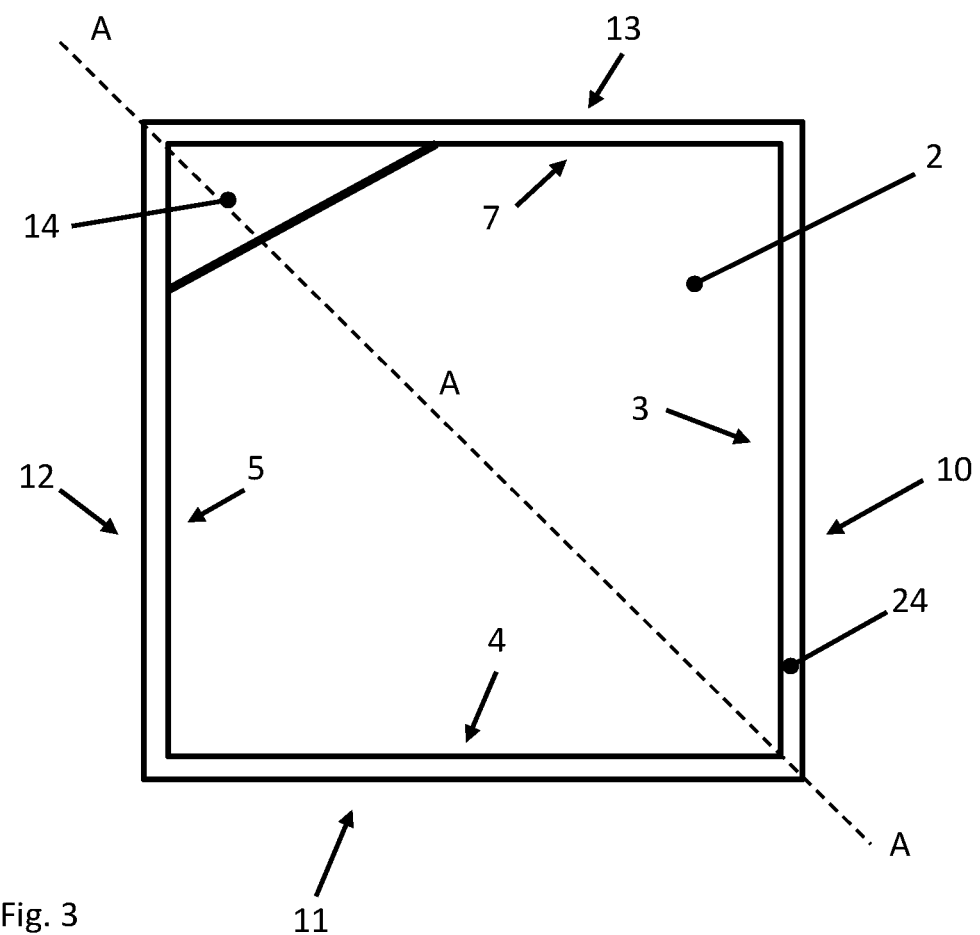
FIG. 3 shows a figure of a collector module in a view from above according to one embodiment of the invention.

FIG. 3 shows the collector module 1 in cross section from above. The outer walls 10, 11, 12, 13 are arranged such that the outer wall 10 bears against the outer wall 11 that bear against outer wall 12 that bears against the outer wall 13. The outer wall 13, the fourth outer wall, is arranged against the first outer wall 10. The baffle 2 are fixedly arranged against the inner side of the outer walls, in which the first mounting side 3 of the baffle 2 is arranged against the first outer wall 10 and the second mounting side 4 is arranged against the second outer wall 11. Part of the baffle 2 could also be attached by mounting side 5 to the third outer wall 12 and by a mounting side 7 to the fourth outer wall 13. The baffle 2, and the mounting of the baffle 2, is arranged to form the opening 14. The baffle 2 spans a surface A. The surface A is arranged wholly or partially perpendicular to or laterally against one or more outer walls, so that the surface A is arranged against the outer wall, yet projects into the channel 20. The surface A of the baffle is inclined or otherwise slopes towards the point 6, which is arranged close to or against one or more outer walls, so that, by virtue of gravity and the flow, particles extracted from the flow, such as an air stream, are transported or otherwise move towards the point 6. At point 6 an outlet, not shown in the figure, could be arranged to empty the collector module from separated particles. The outlet is an opening in the collector module 1 outer walls 10, 11, 12, 13 arranged in the intersection, or corner, formed between two outer walls, such as the first outer wall 10 and the second outer wall 11 or in either the first outer wall 10 or the second outer wall 11 close to the point 6. The outlet could comprise a tube section in which the separated particles are collected. The outlet is arranged to pass through at least one outer wall 10, 11, 12, 13. The baffle 2 slopes with an angle α between 1°-50° and most preferably between 5°-20°. The angle α is defined relative the cross section line A-A going diagonally through the collector module 2 from the corner defined by the intersection of the first outer wall 10 and the second outer wall 11 and to the corner defined by the intersection of the third outer wall 12 and the fourth outer wall 13. The line A-A is in a plane orthogonal from the outer walls. Where a plurality of baffles are arranged in a collector module 1, a second baffle 2' is preferably arranged such that the first mounting side 3' of the second baffle 2' is arranged against the fourth outer wall 13 and the second mounting side 4' of the second baffle 2' is arranged against the third outer wall 12. The second baffle 2' spans a surface A'. Following baffles are preferably placed so that the flow path through the collector module 1 is extended by alternately placing a baffle against the outer walls 10, 11 and the next baffle against the outer walls 12, 13. The opening 14 is thus alternately arranged in the corner formed by outer walls 12, 13, when the baffles are arranged to the outer walls 10, 11 and when the baffles are arranged against outer walls 12, 13 the opening is arranged in the corner formed by outer walls 10, 11

Figure 4:
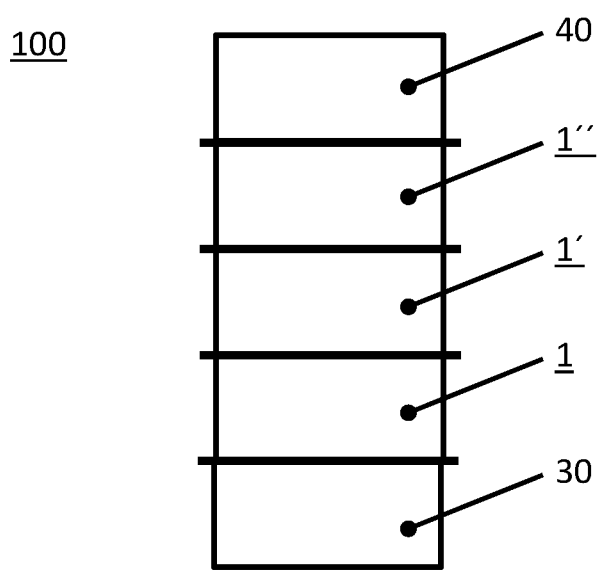
FIG. 4 shows a figure of a particle trap according to one embodiment of the invention.

FIG. 4 shows the particle trap 100 in a configuration comprising three collector modules 1, 1', 1" and one inlet module 30 and one outlet module 40. The number of collector modules could be varied depending upon the medium, such as water or air, used for the flow, such as water flow or air flow and the constitution of the particles, i.e. the size, weight and material properties of the particles. The inlet module leads the flow into the particle trap 100 and could comprise a baffle 2. The inlet module 30 could also be arranged without a baffle and arranged to guide or in another way lead the flow to a first collector module arranged to the inlet module 30. The outlet module 40 is arranged to a collector module 1" and receives the flow from the last collector module 1" of the particle trap 100. The outlet module 40 could comprise a baffle 2. The outlet module 40 could also be arranged without a baffle 2 and arranged to guide or in another way lead the flow from the last collector module 1" and out from the particle trap 100. The outlet flow, through the outlet opening 41, is a flow with reduced number of particles where the particles are collected in the particle trap 100.

Figure 5:
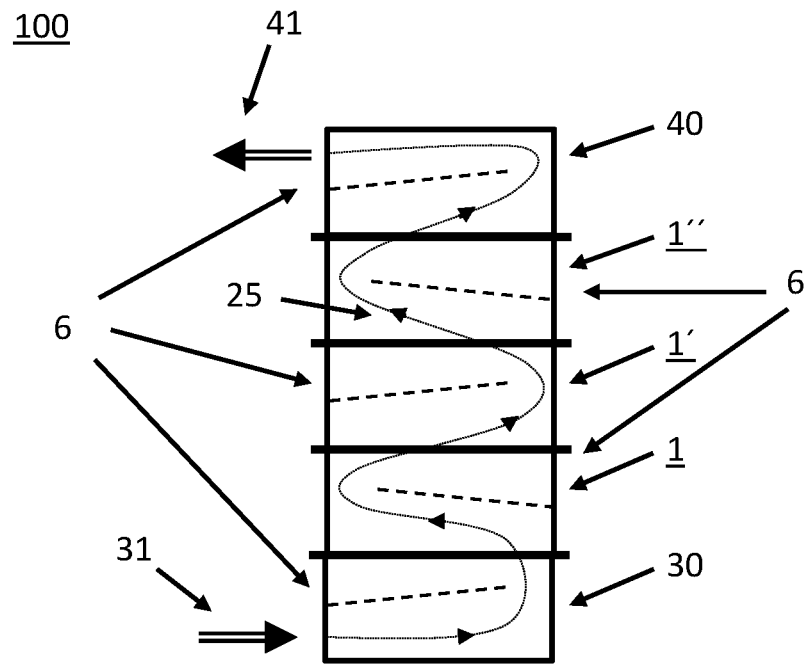
FIG. 5 shows a figure of a particle trap according to one embodiment of the invention.

FIG. 5 shows the particle trap 100 in cross section where the baffles are shown for the inlet module 30, the three collector modules 1, 1' and 1", and the outlet module 40. The flow path 25 for the flow through the particle trap 100 is shown in the figure. The flow is arranged to the lower opening 31, the inlet, and meanders through the particle trap 100 in a flow path 25 and leave the particle trap through an outlet opening 41. Particles are removed, or in another way extracted, from the flow and stay at point 6 on the baffles 2.

Figure 6:
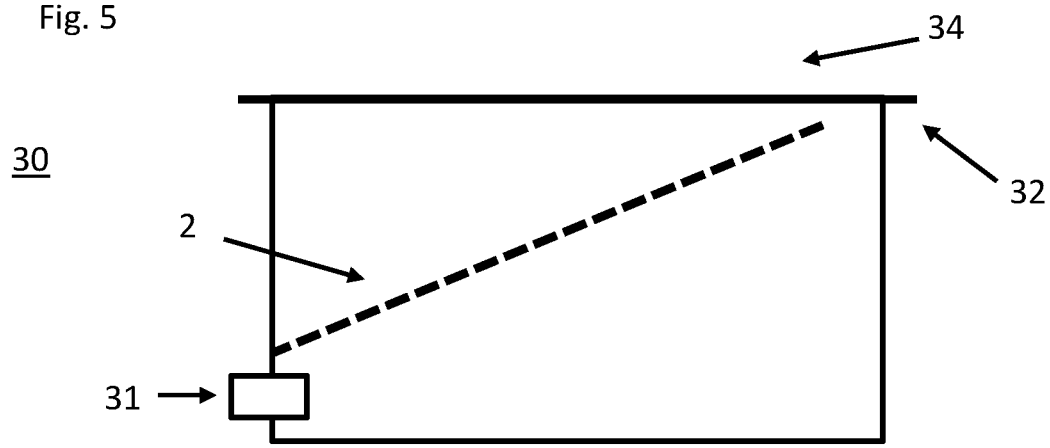
FIG. 6 shows a figure of an inlet module in side view according to one embodiment of the invention.

FIG. 6 shows an inlet module 30 from the side and the baffle 2 is partly shown in a cross section perspective. The inlet module 30 could also be arranged without a baffle 2. The inlet module 30 is preferably arranged with an opening 34, four side walls and a fifth wall, a bottom wall 33. The inlet module 30 is arranged with a lower opening 31 to guide the flow into the particle trap 100. The inlet module 30 could also be arranged with means for affixing or mounting the inlet module 30, and thus the particle trap 100, to a holder or support, not shown in the figure. The inlet module 30 is arranged with an upper mounting flange 32 at the upper opening of the inlet module 30.

Figure 7:
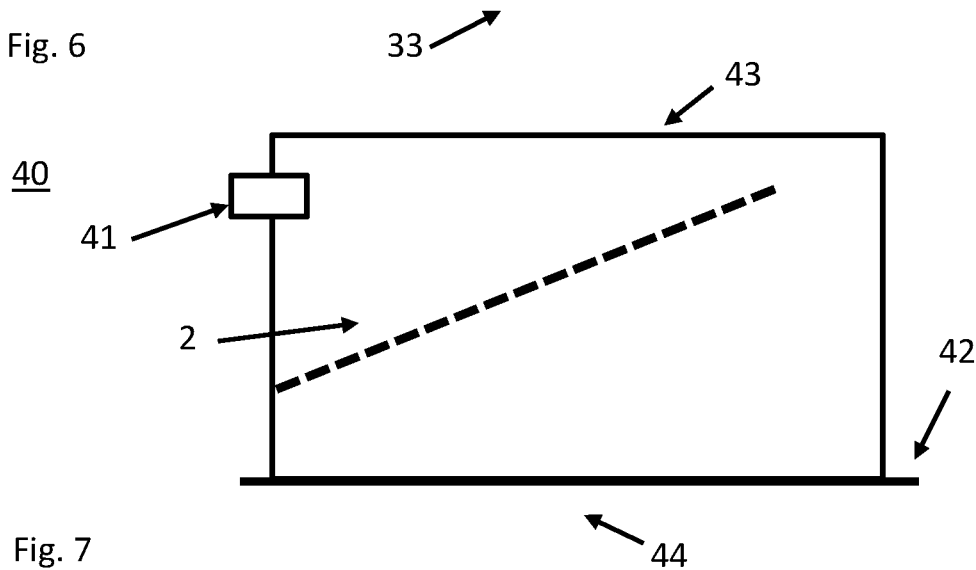
FIG. 7 shows a figure of an outlet module in side view according to one embodiment of the invention.

FIG. 7 shows an outlet module 40 from the side and the baffle 2 is partly shown in a cross section perspective. The outlet module 40 could also be arranged without a baffle 2. The outlet module 40 is preferably arranged with an opening 44, four side walls and a fifth wall, a top wall 43. The outlet module 40 is arranged with an outlet opening 41 to guide the flow out from the particle trap 100. The outlet module 40 is arranged with a lower mounting flange 42 at the lower opening of the outlet module 40.

The particle trap 100, and thus the collector modules 1 and the inlet module 30 and outlet module 40, comprises four outer walls 10, 11, 12, 13 that are placed such that the outer walls are perpendicular to the nearest adjacent outer wall, so that the first outer wall 10 is perpendicular to the fourth outer wall 13 and the second outer wall 11 and, in the same way, so that the third outer wall 12 is perpendicular to the second outer wall 11 and the fourth outer wall 13, forming a substantially rectangular channel 20. The particle trap 100 preferably includes a number of collector modules 1 and hence baffles 2 separated by a predetermined distance which is adapted on the basis of the dimensions of the particle trap 100 and the desired efficiency of the separation. Since the heavier particles which are separated off by the particle trap 100 end up on the baffles 2 which are closer to the lower opening 31 of the flow, the configuration of the baffles can be adapted such that baffles suited to heavier particles are arranged in the lower part of the particle trap 100 and baffles suited to lighter particles are arranged in the upper part of the particle trap 100 close to the outlet opening 41 from the particle trap 100.

The collector module 1, the inlet module 30 and the outlet module 40 could be made of metal such as stainless steel, plastic or other solid material. The material is selected depending upon the intended use of the particle trap 100. A particle trap 100 made of stainless steel could withstand high temperature and have a high resistance towards wear.

The outer walls and the baffle are preferably assembled by welding or soldering. The particle trap 100 could also be made of a plastic or other polymer based material or paper, cardboard, chipboard, wood or other natural and/or synthetic fibre-based material.

The particle trap 100 can consist of a number of collector modules 1, in which each collector module 1 contains at least one baffle 2. The inlet module 30 is arranged with a lower opening 31, an inlet, through which the inlet of the flow is arranged. The outlet module 40 is arranged with an an outlet opening 41, through which the flow pass after the particle trap 100 has been passed through. For a particle trap 100 with three collector modules 1, 1', 1" the lower opening 21 of a first collector module 1 is arranged to the opening 34 of the inlet module 30. The lower opening 21 of a second collector module 1' is arranged against the upper opening 22 of the first collector module 1. The lower opening 21 of a third collector module 1" is arranged against the upper opening 22 of the second collector module 1'. And the opening 44 of the outlet module 40 is arranged to the upper opening 22 of the third collector module 1". The process of arranging two or more modules together enables a particle trap 100 to be assembled with an optional number of modules and thus with an optional number of baffles 2. The upper mounting flange 32 of the inlet module 30 is arranged to the lower mounting flange 23 of a collector module 1 and the flanges are mounted by a number of screws and nuts. An upper mounting flange 24 of a first collector module 1 is arranged to a lower mounting flange 23 of a second collector module 1' and the flanges are mounted by a number of screws and nuts. In the same manner additional collector modules could be connected. The upper mounting flange 24 of the last collector module 1''' is arranged to the lower mounting flange 42 of the output module 40 and the flanges are mounted by a number of screws and nuts. The number of collector modules is possible to change and could be between 1 to 30 collector modules and is preferably between 3 to 9 collector modules.

Each module is preferably placed such that the flow path through the particle trap 1 is extended, by the modules with the baffle 2 being alternately placed in a first and a second direction respectively. Preferably, an assembled particle trap 100 is arranged such that the flow path is winding or that the flow path meanders through the particle trap 100.

A flow is arranged to the inlet module 30. The flow is containing particles, such as minerals, that will be transported through the particle trap 100, in which the particles will be separated or otherwise extracted from the flow against baffles 2 arranged in the particle trap 100, which baffles 2 are arranged sloping towards the outer walls 10, 11, 12, 13 of the collector modules 1, so that the particles, as a result of gravity, are placed on the baffle 2 against the wall of the collector modules 1 of the particle trap 100, the flow flows onward out through the outlet module 40 of the particle trap 100. Due to turbulence generated by the baffles 2 the particles in the flow will fall to the baffles and stay on point 6 located on the baffles 2. Particles collected at point 6 is collected or in another way removed from the particle trap 100.

The flow could be an air flow that is provided by a fan or a water flow provided by a pump or other flow provided by an apparatus arranged to create a flow.

The particle trap can also be provided with a conventional filter, such as a carbon filter or a filter to separate solids from a fluid, for example, in order to filter away solids, organic substances, gases and odours.

ALTERNATIVE EMBODIMENTS

The invention is not limited to the embodiments specifically shown, but can be varied in different ways within the scope of the patent claims.

It will be appreciated, for example, that the number of collector modules, particle traps, and baffles, as well as the integral elements and component parts, is adapted to the filter system(s), and other systems and other current design characteristics.

It will be appreciated that the above-described method for the extraction of particles can be applied, in principle, to all systems for cleaning or separating particles from gases, liquids or solid materials in particle form. By separating it could also mean extracting, concentrating or remove.

The invention claimed is:

1. A collector module for separating particles from a flow, the collector module comprising:
    at least three outer walls;
    at least one baffle;
    a lower opening having a lower mounting flange; and
    an upper opening having an upper mounting flange;
        wherein the at least one baffle forms a surface, in which the surface wholly or partially slopes towards a point, in which the point is arranged close to or against one or more outer walls to which the at least one baffle is affixed, and
        wherein the arrangement of the at least one baffle in the collector module provides an opening in the square channel formed by the at least three outer walls.

2. The collector module for separating particles from a flow according to claim 1, wherein the lower mounting flange and the upper mounting flange are provided with holes.

3. The collector module for separating particles from an flow according to claim 1, wherein the collector module is arranged with at least four outer walls forming a substantially square-shaped channel containing at least one baffle.

4. The collector module for separating particles from a flow according to claim 1, wherein the collector module is made from steel or other metal.

5. The collector module for separating particles from a flow according to claim 1, wherein the collector module is arranged with an outlet arranged through at least one outer wall.

6. A particle trap for separating particles from a flow, wherein the particle trap comprises at least one inlet module, at least one collector module, and at least one outlet module;
    wherein the at least one collector module comprises at least one baffle and at least three outer walls; and
    wherein the at least one baffle is arranged sloping towards the outer walls to create a particle outlet.

7. The particle trap for separating particles from a flow according to claim 6, wherein two or more collector modules are placed such that the flow path through the particle trap is extended by alternately arranging the at least one baffle against a first outer wall and a second outer wall, and the next baffle against a third outer wall and a fourth outer wall.

8. The particle trap for separating particles from a flow according to claim 6, wherein the inlet module is arranged with a flange arranged to fit a lower mounting flange of the at least one collector module of the particle trap providing for vertical stacking of two or more collector modules.

9. A particle trap for separating particles from a flow according to claim 6, wherein the outlet module is arranged with a flange arranged to fit an upper mounting flange of the at least one collector module of the particle trap providing for vertical stacking of two or more collector modules.

* * * * *